Jan. 26, 1943.  A. L. KING  2,309,322
BOLTLESS GUY FITTING
Filed Oct. 18, 1941
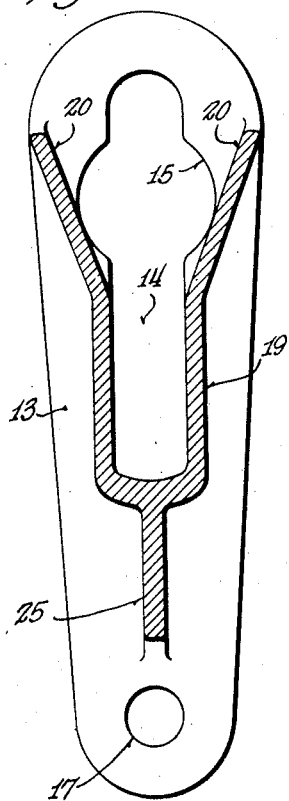
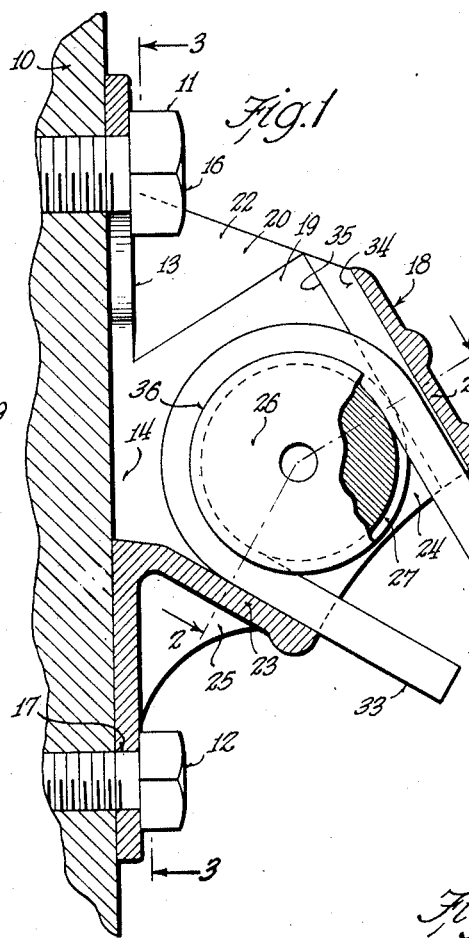
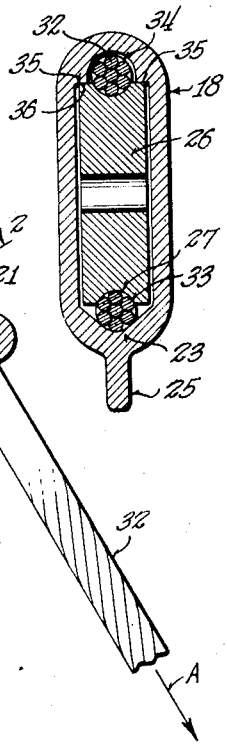
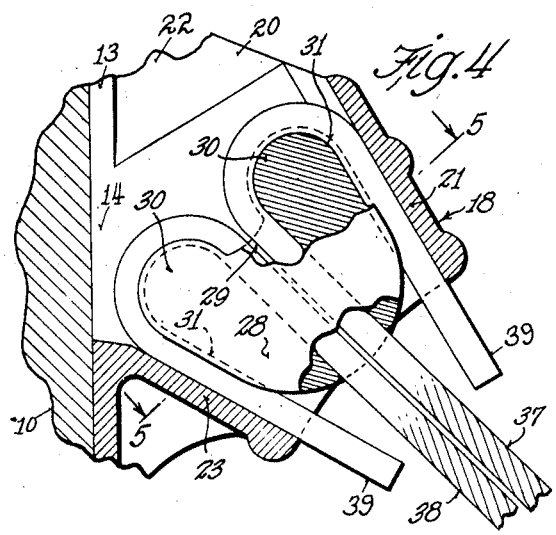
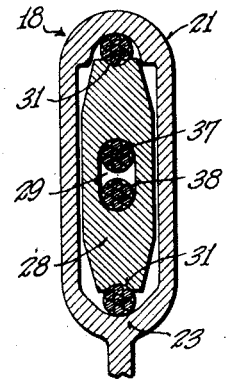
INVENTOR.
Andrew Lewis King
BY Chester W. Brown
ATTORNEY.

Patented Jan. 26, 1943

2,309,322

UNITED STATES PATENT OFFICE 2,309,322

BOLTLESS GUY FITTING

Andrew Lewis King, Toronto, Ontario, Canada, assignor to Line Material Company, Milwaukee, Wis., a corporation of Delaware Application October 18, 1941, Serial No. 415,559

3 Claims. (Cl. 24—126)

This invention relates to improvements in boltless guy fittings.

One object of this invention is to provide a boltless guy fitting adapted for dead-ending cables or the like, wherein means are provided for facilitating the assembly of the cable with a snubbing element, the means being closed against entrance therethrough when the fitting is mounted in operating position.

More particularly, it is an object to provide a boltless guy fitting having snubber parts cooperatively related in such a manner as to prevent damage to the finish, as for example the galvanize used to prevent rusting of the parts, during installation of the fitting.

Another object is to provide for the boltless guy fitting a snubber element having a cable receiving opening through which a plurality of cables may be passed, thereby permitting the dead-ending of more than one cable to the fitting.

Still another object is to provide a boltless guy fitting having a snubbing means including an opening adapted to permit the assembly of the parts therewith, the parts being retained in the snubbing means by means of a bolt adapted to support the fitting in place.

In the drawing:

Fig. 1 is a sectional view showing the device in operating position.

Fig. 2 is a view taken on the line 2—2 of Fig. 1.

Fig. 3 is a view taken on the line 3—3 of Fig. 1.

Fig. 4 is a sectional view of a modified form of the invention.

Fig. 5 is a view taken on the line 5—5 of Fig. 4.

Like parts are designated by the same reference numerals throughout the several views.

The boltless guy fitting shown in Fig. 1 is mounted on a suitable support, as for example an electrical transmission pole 10 (fragmentarily shown), by means of bolts 11 and 12.

The fitting is cast as an integral unit and comprises an elongated base portion 13 curved to fit the curvature of the pole 10. The base 13 is provided with an elongated slot or opening 14 widened at 15 to permit the entrance of the bolt head 16 for reasons hereinafter to be described. An aperture 17 is provided at the lower end of the base 13 to receive the bolt 12.

A snubber housing 18, integral with the base portion 13, comprises a pair of five sided parallel wall members 19 extending outwardly from opposite sides of the opening 14. The upper side of each member 19 flares upwardly and rearwardly at 20 toward the base portion 13 on opposite sides of the widened portion 15. The flared portions 20 permit the insertion of the bolt 11 either from the rear or from the front as hereinafter more fully described. The outer upper side of the wall members 19 are integrally joined by means of a top side wall 21 which extends downwardly and away from the base portion; and which is spaced from the base portion 13, thereby forming an opening 22 into the housing 18 with the flared portions 20.

The lower inner side of each wall member 19 is integrally joined by means of a snubber wall 23. The wall 23 is integral at one end with the base portion 13 adjacent the lower end of the opening 14 and extends downwardly and away from the base portion in converging relationship with the side wall 21 and forms a cable entrance opening 24 with the wall members 19 and the top side wall 21.

A web 25 extends downwardly from the snubber wall 23 and acts as a means for strengthening the housing against rupture.

A clamping element 26 is carried by the housing as shown and is inserted therein either through the opening 14 in the base or through the opening 22 at the top of the housing.

The clamping element 26 shown in Fig. 1 is of the circular type provided with a peripheral cable groove 27. As the element moves toward the converged end of the housing, the periphery of the element is brought into wedging relationship with the side walls 21 and 23.

Fig. 4 shows a modified fitting wherein all parts are similar to those described with reference to Fig. 1, except for the clamping element 28. The clamping element 28 is heart-like in shape and includes a cable opening 29 extending centrally through the element as shown. Arcuate guide portions 30 are formed at one end of the opening 29 on opposite sides thereof. A cable groove 31 extends throughout the cable engaging periphery of the element as shown.

A cable 32 may be assembled with the guy fitting before the fitting is mounted on a pole to be braced by passing one end of the cable 32 into the housing 18 through the opening 24, through the housing and out through the opening 14 in the base 13. Outside of the confining walls of the housing 18 the cable 32 is looped about the clamping element 26. The looped end of the cable and the element are then moved through the opening 14 into the housing 18. The assembled parts are then ready to be attached to the pole 10.

The lag screw or through bolt 11 is secured to the pole with the head 16 spaced a short distance from the pole as shown. The fitting together with the attached cable is mounted on the bolt by moving the fitting toward the bolt so that the head 16 passes through the opening 15 in the base 13. The fitting is then permitted to drop downwardly on the bolt, thereby positioning the bolt in the upper constricted opening of the slot 14. The bolt is then tightened against the base 13 to secure the fitting against movement. Additional support is accomplished by inserting a second bolt 12 through the aperture 17.

With the fitting in place, the cable 32 may be anchored to any suitable support as, for example, a ground rod (not shown) and drawn up to brace the pole. As the cable is drawn up at the ground rod end by any suitable means as a block and tackle (not shown), the cable tends to move in the direction indicated by the arrow A and in so moving rotates the clamping element 26 in a clockwise direction relative to Fig. 1 on the free end 33 of the cable. As the element 26 rotates toward the opening 24 the converging side walls 21 and 23 engage the cable 32 on opposite sides of the element slightly forward of the center thereof, and wedges the cable against further movement.

It may be noted that the upper side wall 21 is provided with a cable groove 34 terminating in shoulders 35. These shoulders 35 cooperate with the peripheral shouldered portions 36 on each side of the cable groove 27 on the element 26 to prevent rubbing contact of the cable 32 with the cable receiving groove 34. In this manner there is no damage to the finish of the fitting, as for example the galvanize coating with which the fitting is provided to prevent rusting, by parts rubbing against each other. A slight amount of rubbing may occur between the shouldered portions 35 and 36 at points of immediate contact, but this is negligible.

The fitting shown in Fig. 1 may also be installed by first mounting the element 26 in the housing 18 through either opening 14 or 22 and then securing the fitting in place by means of the bolt 11. It is noted that after the bolt is in position the head thereof obstructs the opening 22 against the removal of the element 26. The cable is threaded in through the opening 24 between the upper side of the element 26 and the side wall 21 and out through the upper opening 22.

The free end of the cable is bent to form a loop and passed through the opening 22 into the housing 18 between the lower side of the element 26 and the side wall 23 and out through the opening 24. The former method of assembly is preferred where exceptionally stiff cables are used since there is no need to thread the free end of the cable through the housing in the manner described with reference to the second method of assembly.

Where it is desired to use more than one cable for bracing purposes, as for example where more bracing strength is needed, or where it is necessary to brace against lateral as well as forward movement of the pole, the heart-shaped clamping element 28 is used in combination with two cables 37 and 38.

Before the fitting is mounted on the pole 10, the cables 37 and 38 are passed through the opening 24, through the housing 18, and out through the opening 14. The cables are threaded through the element opening 29 a short distance and the free end 39 of each cable is reversely curved in opposite directions over corresponding guide portions 30 and made to lie in the cable groove 31.

The assembled parts are then moved through the opening 14 into the housing 18 where the free end of the cable 37 is wedged between the upper side of the element 28 and the side wall 21, and the free end of the cable 38 is wedged between the lower side of the element 28 and the side wall 23. The fitting is then mounted on the pole 10 in the manner described with reference to Fig. 1.

The cables 37 and 38 may also be dead-ended to the fitting after the fitting has been bolted in place by threading the free end of the cables through the opening 29 in the element 23 which is supported in the housing 18 and out through the upper opening 22. Each free end is then reversely curved rearwardly and threaded into the position shown in Fig. 14. Where extremely stiff cables are used the former method of assembly is more expedient.

It may also be noted that one cable may be dead-ended to the fitting when the heart-shaped element 28 is used by simply using one cable in place of two.

From the foregoing it is apparent that the objects of this invention have been attained by providing a novel boltless guy fitting which may be quickly and easily installed, which is positive in operation and which is adapted to dead-end more than one cable when so desired.

I claim:

1. A device for anchoring a guy cable to a pole or the like comprising: a member including a base portion having a vertically elongate rear surface designed to bear against a supporting surface such as the peripheral surface of a transmission line pole, said member being designed for mounting with its base portion extending vertically, lengthwise, said member including a portion defining a rearwardly-forwardly trending tapered passageway extending normally to said rear surface and sloping downwardly therefrom and having one end terminating in a vertically extending elongate slot piercing said base portion, clamping means co-operative with a cable for wedging the cable in said passageway and anchoring the cable to said member, said slot having a portion designed to clear the head of a mounting bolt, and a narrower portion above said widened portion, said narrower portion being of a width to receive and clear the body of said mounting bolt but not wide enough to clear the head thereof, said clamping means, together with the aforementioned cable looped therearound, being insertable into said passageway through said slot from the rear of said casting.

2. The combination with structure having an attachment surface and a bolt-like element whereof the head portion projects from said surface with the head per se spaced from said surface, said element being secured to said structure, and a device for anchoring a cable to said attachment surface through the medium of said element, said device comprising a member having a base portion with a rear surface contacting said attachment surface, said base portion having an elongated slot therethrough, said slot having a widened portion dimensioned to clear the head of said element to permit said head to be projected through said slot from the rear to the front of said base portion, said slot having a narrowed portion merging into said widened portion, said narrowed portion being designed to permit its defining edge structure to slide under the head of said element for anchoring said member to said attachment surface, said member having a portion defining a tapered passageway terminating at one end in said slot, said passageway being open at its forward end and extending normally to said attachment surface and angularly thereto, and means in said passageway for wedgingly securing a cable therein, said means being co-operative to that end with the walls defining said passageway.

3. The combination with structure having a vertical attachment surface and a bolt-like element whereof the head portion projects from said surface with the head per se spaced from said surface, said element being secured to said structure, of a device for anchoring a cable to said attachment surface through the medium of said element, said device comprising a member including a base portion having a vertical elongate rear surface contacting said attachment surface, said base portion having a vertically elongated slot therethrough, said slot having a widened portion dimensioned to clear the head of said element to permit said head to be projected through said slot from the rear to the front of said base portion, said slot having a narrowed portion situated above and merging into said widened portion, said narrowed portion being designed to permit its defining edge structure to slide under the head of said element for anchoring said member to said attachment surface, said member having a portion projecting forwardly from said base portion and defining a tapered passageway sloping downwardly and forwardly from said base portion, said passageway being convergent forwardly and open at both ends, said vertically elonagted slot constituting the rear terminus of said passageway, and a disc-like element having a peripheral groove for the reception of a cable and operative to wedgingly clamp a cable in said passageway, said disc-like element, with the cable looped peripherally therearound, being insertable into said passageway through said slot from the rear of said member.

ANDREW LEWIS KING.